W. F. GEORGE.

HAIR CRIMPER.

No. 1,539. Reissued Sept. 15, 1863.

Witnesses:

Inventor

W. F. George

THE NORRIS PETERS CO., PHOTO-LITHO., WASHINGTON, D. C.

UNITED STATES PATENT OFFICE.

ABBY A. LIVINGSTON, OF NEW YORK, N. Y., ASSIGNEE OF W. F. GEORGE, OF SAME PLACE.

IMPROVEMENT IN HAIR-CRIMPERS.

Specification forming part of Letters Patent No. 230, dated January 29, 1861; Reissue No. 1,539, dated September 15, 1863.

*To all whom it may concern:*

Be it known that W. F. GEORGE, of the city, county, and State of New York, invented a new and useful Implement or Device for Crimping Ladies' Hair; and I do hereby declare that the following is a full, clear, and exact description of the same, reference being had to the accompanying drawings, making a part of this specification, in which—

Figure 1:
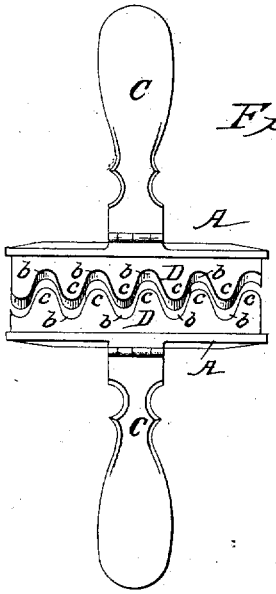
Figure 2:
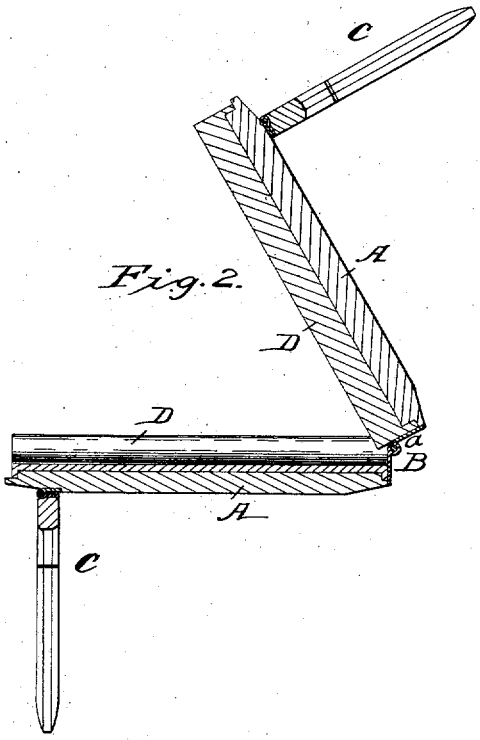
Figure 4:
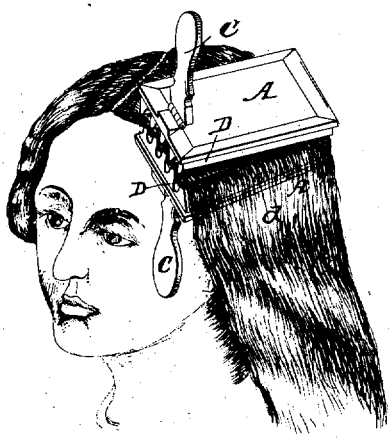
Figure 3:
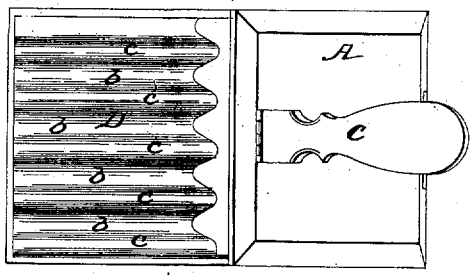

Figure 1 is an end view of the said invention; Fig. 2, a longitudinal central section of the same; Fig. 3, a plan or top view of the same in a partially-opened state; Fig. 4, a view of a braid of hair, showing the way the implement is used.

Similar letters of reference indicate corresponding parts in the several figures.

This invention relates to an implement or device for crimping at one operation the hair at one side of the head, the necessary number of folds or plaits (five being generally made) being all formed at one pressure and extending from within a short distance of the central parting of the hair to about the lower part of the ear. This crimping of the hair, now fashionable with ladies, is by the usual implement attended with considerable trouble, one fold or plait only being formed or produced at once, and great care being required to perform the work neatly.

To obviate this difficulty and provide an implement which is at once easy of application and effective in operation are the principal objects of the present invention; and to these ends the invention consists, first, in the employment or use of a pair of blocks or plates of any suitable material correspondingly grooved or corrugated, and connected by one or more hinges applied either directly or through the medium of suitable backs; second, in the combination of handles of peculiar construction with the said hinged and corrugated blocks or plates.

To enable those skilled in the art to fully understand and construct the invention, I will proceed to describe it.

A A represent two blocks or plates, of wood or other material, which are connected at one end by a hinge or joint, B, and may be provided each with a handle, C, at the opposite ends, the handle C being connected by joints or hinges *a* to the blocks A A. The faces of the blocks A A are correspondingly fluted or corrugated, or may be provided with fluted or corrugated plates D D, attached one to each block. These plates may be cast solid, or they may be struck up or swaged in proper form from sheet metal, or formed of hard wood. The faces of the blocks or plates are fluted longitudinally, and the prominences of one face are opposite the depressions of the other, so that when the blocks are closed the ribs will fit between each other, as shown clearly in Fig. 1. The blocks or plates are provided with as many flutes as there are folds or plaits required. The depression *b* of the blocks or plates are larger in their transverse section than the prominences *c*, so that when the instrument is closed a zigzag space will be allowed between the flutes or ribs. This is essential to allow the plates to close with the hair between them, so that the hair may be subjected to an equal pressure throughout the whole length of the plates.

The instrument is constructed of sufficient length to crimp a layer of hair of the desired width at each side of the head.

The implement is used as follows: The two blocks A A are distended or opened before a fire, so that the corrugated faces will be properly heated, the handles C C, if used, being turned back, in order to avoid being heated. The hair is then adjusted or parted with a proper layer, *d*, at each side, (see Fig. 4,) and when the faces are sufficiently heated the operator grasps the implement and embraces the layer *d* of hair at one side of the head and presses the blocks or plates together, so as to crimp the layer at the desired spot. In Fig. 4 the way in which the implement is applied to the hair is shown.

By this invention it will be seen that the crimping of the hair may be very expeditiously and perfectly accomplished. In using an ordinary implement, similar to a curling-tongs, which forms one plait or fold only at once, much difficulty is encountered in forming the folds or plaits parallel with each other, besides considerable time is expended in performing the work, which at the best is but imperfectly done, owing to the tendency of the implement while forming one fold or plait to destroy the adjoining one formed at the preceding operation.

The wooden blocks A A, or blocks of other material, which is a non-conductor of heat, are beneficial in preventing the radiation of heat from the backs of the plates D D, if made of metal. These blocks protect the hands of the operator and render the operation throughout more agreeable than it would otherwise be.

By constructing the implement entirely of wood an additional and very important advantage is secured, namely, preventing injury to the hair by overheating. Black walnut or wood of analogous character will retain sufficient heat to crimp the hair quickly and effectually, but cannot, without charring, be made sufficiently hot to injure the hair.

Having thus described the invention of the aforesaid W. F. GEORGE, what I claim as new therein, and desire to secure by Letters Patent, is—

1. A hair-crimper formed of a pair of fluted or corrugated plates or blocks, D, of any suitable material, connected by hinge or hinges B, attached either directly to the plates or blocks or through the medium of separate backs A, and this either with or without handles C.

2. The handles C C, connected by hinges *a a* to the corrugated blocks or plates D or backs A in the manner and for the purpose set forth.

ABBY A. LIVINGSTON.

Witnesses:
RICHD. M. LIVINGSTON,
W. P. JAMES.